US008287963B2

(12) United States Patent
Iftime et al.

(10) Patent No.: US 8,287,963 B2
(45) Date of Patent: Oct. 16, 2012

(54) ERASABLE MEDIUM WITH UNCOATED SUBSTRATE

(75) Inventors: Gabriel Iftime, Mississauga (CA); Jason Leong, Richmond (CA); Daryl Vanbesien, Burlington (CA); Caroline Turek, Mississauga (CA); Gail Song, Milton (CA); Kentaro Morimitsu, Mississauga (CA); Adela Goredema, Mississauga (CA); Peter M. Kazmaier, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 198 days.

(21) Appl. No.: 12/854,461

(22) Filed: Aug. 11, 2010

(65) Prior Publication Data
US 2012/0040199 A1    Feb. 16, 2012

(51) Int. Cl.
*B05D 3/02*    (2006.01)

(52) U.S. Cl. ............... 427/385.5; 427/384; 427/389.9; 427/391; 427/392; 427/393; 427/393.5; 427/394; 427/395; 427/396; 427/397; 427/209

(58) Field of Classification Search .................. None
See application file for complete search history.

(56) References Cited

U.S. PATENT DOCUMENTS

| 7,229,740 | B2 * | 6/2007 | Iftime et al. | ............... | 430/270.1 |
| 7,538,070 | B2 * | 5/2009 | Iftime et al. | ................... | 503/201 |
| 2005/0196618 | A1 * | 9/2005 | Knox et al. | .................... | 428/414 |
| 2005/0244742 | A1 * | 11/2005 | Iftime et al. | ............... | 430/270.1 |

\* cited by examiner

*Primary Examiner* — Erma Cameron
(74) *Attorney, Agent, or Firm* — MH2 Technology Law Group LLP (57) ABSTRACT

Provided are compositions and methods for making an erasable medium that can include an aqueous photochromic emulsion including a photochromic polymer, a polymer binder, and water.

12 Claims, 4 Drawing Sheets

ERASABLE MEDIUM WITH UNCOATED SUBSTRATE

CROSS-REFERENCE TO RELATED APPLICATIONS

Co-pending application Ser. No. 12/814,418, filed Aug. 11, 2010, titled "Stabilized Photochromic Ink for Reusable Paper Annotation," is assigned to the same assignee of the present application. The whole disclosure of the co-pending application is incorporated herein by reference in its entirety.

DETAILED DESCRIPTION

1. Field of Use

The present teachings relate generally to erasable media and, more particularly, to compositions and methods for making erasable media comprising an aqueous photochromic emulsion.

2. Background

Paper documents are often promptly discarded after being read. Although paper is relatively inexpensive, the quantity of discarded paper documents is enormous and the disposal of these discarded paper documents raises significant cost and environmental issues. It would, therefore, be desirable for paper documents to be reusable to minimize both cost and environmental issues.

Erasable media is that which can be reused many times to transiently store images, the images being written on and erased from the erasable media. For example, photochromic paper employs photochromic materials to provide an imagable surface. Typically, photochromic materials can undergo reversible or irreversible photoinduced color changes in the photochromic containing layer. In addition, the reversible photoinduced color changes enable imaging and erasure of photochromic paper in sequence on the same paper. For example, a light source of a certain wavelength can be used for imaging erasable media, while heat can be used for inducing erasure of imaged erasable media. In addition, specific temperature parameters can be required for each of the imaging and erasing of erasable media. While traditional imaging devices are suitable for performing conventional imaging of non-erasable media, their architecture can be insufficient for handling erasable media alone or in combination with non-erasable media.

A known method for producing erasable media involves coating a paper substrate with a coating composition made of a photochromic material and a polymer binder in a solvent. The binder increases viscosity of the photochromic coating composition. A higher viscosity provides a thicker coating, which increases the amount of photochromic material per surface unit. An increased amount of photochromic material in the coating composition is desired for initial writability of the erasable media.

Conventional solvent-based coating compositions require a coated paper substrate because otherwise, solvent-based coatings penetrate the pores of regular paper instead of forming a film on top of the substrate surface. As such, a large amount of photochromic material is wasted because it sits in the body of the paper, unavailable to be transformed by radiant energy. This increases materials costs and contributes to poor writability of the erasable media. Other disadvantages to using coated paper substrates include higher substrate costs; an undesirable texture (e.g., thick, plastic-like feeling); and higher overall energy input as compared to regular, uncoated substrates.

Thus, it is desirable for erasable media to use an uncoated substrate. For example, it would be desirable for an erasable medium to use regular, uncoated paper, which is cheaper than coated paper and reduces the overall energy input as compared to coated paper. Additionally, using an uncoated substrate provides an overall "greener" reusable product as compared to a conventional coated substrate.

Accordingly, there is a need to overcome these and other problems of the prior art and to provide erasable media with reduced cost, better texture, and/or overall "greener" reusability as compared with conventional erasable media.

SUMMARY

According to various embodiments, the present teachings include a method for making an erasable medium including providing a substrate having a surface free energy; preparing an aqueous photochromic emulsion having a surface tension greater than the surface free energy of a substrate, wherein the aqueous photochromic emulsion comprises a photochromic polymer, a polymer binder, and solvent, wherein the solvent consists essentially of water; applying the aqueous photochromic emulsion to the substrate; and drying the applied aqueous photochromic emulsion on the substrate to form a photochromic layer. The aqueous emulsion can have a surface tension ranging from about 30 to about 50 dynes/cm.

According to various embodiments, the present teachings further include a layered material including an uncoated substrate having a first and a second surface free energy, and an aqueous photochromic emulsion disposed over a first surface of the substrate, wherein the aqueous photochromic emulsion has a surface tension greater than the first surface free energy of the substrate, and wherein the aqueous photochromic emulsion comprises a photochromic polymer, a polymer binder, and solvent, wherein the solvent consists essentially of water.

According to various embodiments, the present teachings also include an aqueous photochromic emulsion for forming an imagable layer on a substrate, the emulsion including a photochromic polymer, a polymer binder, and solvent, wherein the solvent consists essentially of water, wherein the aqueous phochromic emulsion provides a surface tension greater than the surface free energy of the substrate. The aqueous photochromic emulsion can further be applied to a substrate and dried to form a photochromic layer on the substrate.

It is to be understood that both the foregoing general description and the following detailed description are exemplary and explanatory only, and are not restrictive of the present teachings as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and which are shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

As used herein, the term "erasable media" or "erasable medium" refers to transient material that has the appearance and feel of traditional paper, including cardstock and other weights of paper. Erasable media can be selectively imaged and erased.

As used herein, imaged erasable media refers to erasable media having a visible image thereon, the image a result of, for example, ultraviolet (UV) imaging of the erasable media.

Figure 1A:
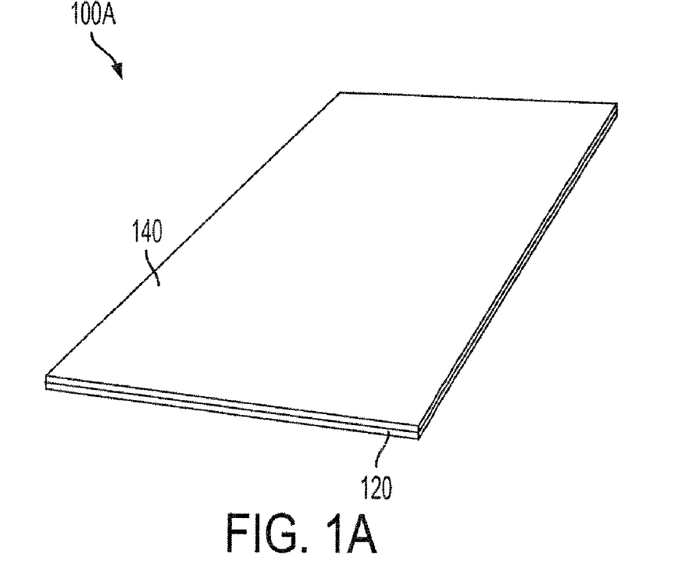
FIG. 1A depicts an exemplary layered material in accordance with various embodiments of the present teachings.

As used herein, non-imaged erasable media refers to erasable media which has not been previously imaged, or erasable media having an image erased therefrom and available for UV imaging. An exemplary erasable medium is described in connection with FIG. 1 below.

As used herein, the term "non-erasable" refers to traditional media of the type used in any conventional imaging such as ink jet, xerography, or liquid ink electrophotography, as known in the art. An example of a non-erasable traditional medium can be conventional paper.

Exemplary embodiments provide compositions and methods for an erasable medium that includes a photochromic layer over a substrate. In embodiments, the photochromic layer can be derived from an aqueous photochromic emulsion comprising a photochromic polymer dispersed in a polymer binder. The photochromic polymer can include at least one photochromic moiety covalently bound to a backbone portion. The backbone portion can include, for example, a non-photochromic polymer. In embodiments, the polymer binder and the backbone portion of the photochromic polymer can be similar type polymers having at least one similar functional group.

FIG. 1A depicts an exemplary layered material 100A in accordance with various embodiments of the present teachings. It should be readily apparent to one of ordinary skill in the art that the layered material 100A depicted in FIG. 1A represents a generalized schematic illustration and that other components can be added or existing components can be removed or modified.

As shown, the layered material 100A can include a substrate 120 and an aqueous photochromic emulsion 140 disposed over the substrate 120. The layered material 100A can include a substrate 120 and an aqueous photochromic emulsion 140, including a photochromic polymer and a polymer binder, applied on the substrate 120. The aqueous photochromic emulsion 140 can be dried to provide a reversible writing (i.e. erasable) image-forming component (e.g., a photochromic layer) on the substrate 120.

In various embodiments, the substrate 120 can be made of a flexible or a rigid material and can be transparent or opaque. The substrate 120 can include, for example, any suitable material such as paper, wood, plastics, fabrics, textile products, polymeric films, and the like. The paper can include, for example, plain papers such as XEROX® 4200 papers, ruled notebook paper, bond paper, and the like. The plastic can include clear, translucent, or opaque plastics, for example, a plastic film made of polyethylene, polyethylene terephthalate, polyethylene naphthalate, polystyrene, polycarbonate, or polyethersulfone. The substrate 120, such as a sheet of paper, can have a blank appearance.

In various embodiments, the substrate 120 can be a single layer or multi-layer where each layer is the same or different material and can have a thickness, for example, ranging from about 0.3 mm to about 5 mm.

Figure 1B:
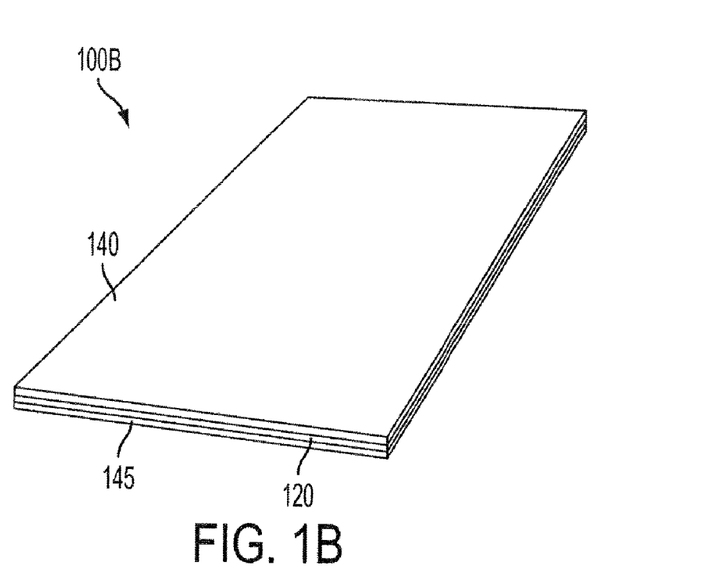
FIG. 1B depicts another exemplary layered material in accordance with various embodiments of the present teachings.

FIG. 1B shows another exemplary layered material 100B in accordance with various embodiments of the present teachings. As compared with the layered material 100A, the layered material 100B can further include a second aqueous photochromic emulsion 145, including a photochromic polymer and a polymer binder, disposed over the substrate 120 on a side opposite to the aqueous photochromic emulsion 140. In various embodiments, the second aqueous photochromic emulsion 145 and the aqueous photochromic emulsion 140 can be the same or different. The second aqueous photochromic emulsion 145 can be dried to provide a reversible writing (i.e. erasable) image-forming component (e.g., a photochromic layer) on the substrate 120.

The aqueous photochromic emulsion 140, 145 can be applied or coated to the substrate 120, for example, a porous substrate such as paper. In various embodiments, the aqueous photochromic emulsion 140, 145 can be applied uniformly to the substrate 120 and dried, or otherwise permanently affixed thereto, to form a photochromic layer.

Figure 2A:
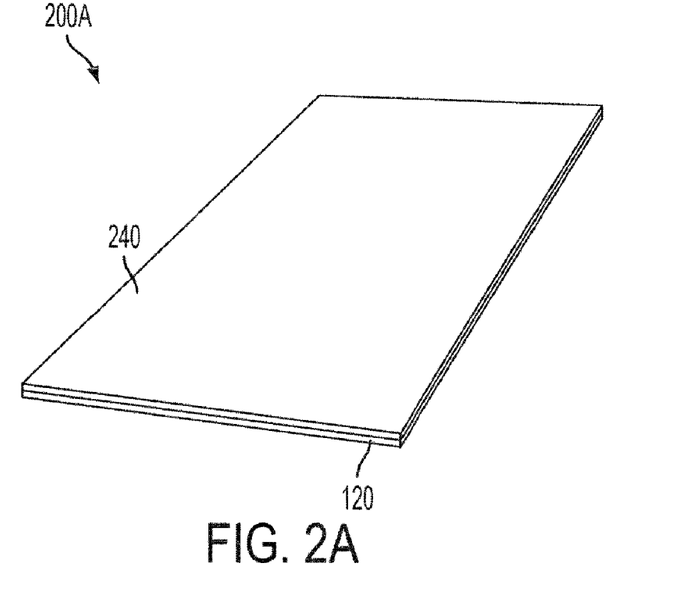
FIG. 2A depicts an exemplary erasable medium in accordance with various embodiments of the present teachings.
Figure 2B:
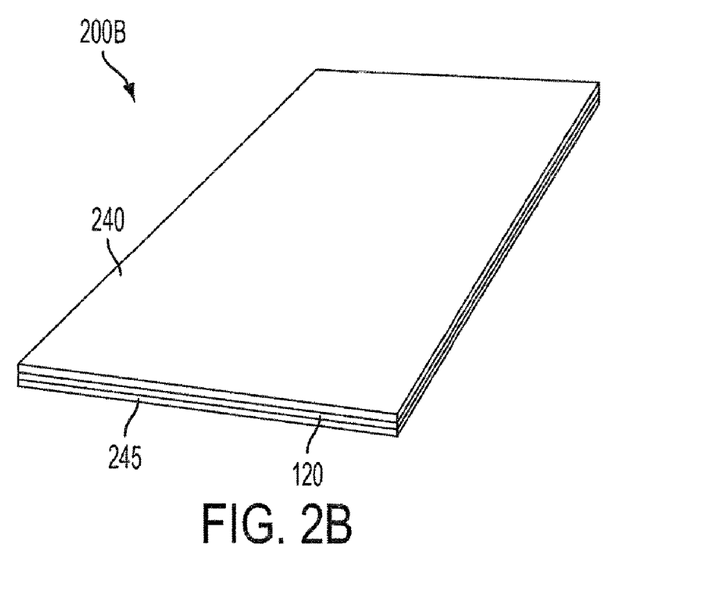
FIG. 2B depicts another exemplary erasable medium in accordance with various embodiments of the present teachings.

FIG. 2A shows an exemplary erasable medium 200A in accordance with various embodiments of the present teachings. The aqueous photochromic emulsion 140 disposed over the substrate 120 can be dried to form a photochromic layer 240, including a photochromic polymer and a polymer binder, on the erasable medium 200A. The photochromic layer 240 can be imaged and portion(s) of an imaged photochromic layer can be erased. In order to produce the transition from a visible image to an erased medium, heat can be applied to the erasable medium 200A at a temperature suitable for effecting the erasure. For example, at a temperature between about 80° C. to about 200° C., the erasable medium 200A can be completely erased. In order to re-image the erased (or image an original) erasable medium, the erasable medium 200A can be heated to a temperature of between about 55° C. to about 80° C. before writing using, for example, UV exposure. FIG. 2B shows another exemplary erasable medium 200B in accordance with various embodiments of the present teachings. As compared with the erasable medium 200A, the erasable medium 200B can further include a second photochromic layer 245, including a photochromic polymer and a polymer binder, disposed over the substrate 120 on a side opposite to the photochromic layer 240. In an embodiment, the second aqueous photochromic emulsion 145 disposed over the substrate 120 can be dried to form the second photochromic layer 245 on the erasable medium 200B. In various embodiments, the second photochromic layer 245 and the photochromic layer 240 can be the same or different. The photochromic layer 240, 245 can be imaged and portion(s) of an imaged photochromic layer 240, 245 can be erased. In order to produce the transition from a visible image to an erased medium, heat can be applied to the erasable medium 200B at a temperature suitable for effecting the erasure. For example, at a temperature between about 80° C. to about 200° C., the erasable medium 200B can be completely erased. In order to re-image the erased (or image an original) erasable medium, the erasable medium 200B can be heated to a temperature of between about 55° C. to about 80° C. before writing using, for example, UV exposure.

It will be appreciated that other types of erasable media, other than photochromic paper, can be used in connection with the exemplary embodiments herein. Such types of erasable media are intended to be included within the scope of the disclosure. Traditional prints and copies can be produced by ink jet. The ink jet can include aqueous ink jet, solid ink jet, and gel ink jet.

The aqueous photochromic emulsion 140 or 145 of FIGS. 1A-1B can include, for example, an aqueous photochromic emulsion comprising a photochromic polymer, a polymer bender, a solvent—such as water—and optionally a wax. As shown in the following Formula I, the photochromic polymer can include at least one photochromic moiety covalently bound to a backbone portion.

Formula I

In Formula I, the backbone portion can be present in an amount ranging from 0 to about 95%, or ranging from 10% to about 90%, or ranging from 10% to about 50% by weight of the total photochromic polymer of Formula I with n ranging from 0 to about 1000. Still in Formula I, the photochromic moiety can be present in an amount ranging from about 0.1% to about 100%, or ranging from 10% to about 90%, or ranging from 10% to about 50% by weight of the total photochromic polymer of Formula I with m ranging from 1 to about 1000.

In embodiments, the photochromic moiety can include one or more photochromic molecules or compounds bound to the backbone portion within its polymer chain. In embodiments, the photochromic moiety can be introduced into the polymer chain of the backbone portion by, for example including the photochromic molecules or compounds during the preparation process of the backbone portion, such as in the form of reactive units, monomer units, or the like. Alternatively, the photochromic moiety can be added to an already formed backbone portion through known chemical functionalization reactions.

In various embodiments, where multiple types of photochromic moiety are present in the polymer chain of the backbone portion, the multiple types of photochromic moiety can be the same or different in the photochromic polymer of Formula I.

In various embodiments, the aqueous photochromic emulsion 140 or 145 of FIGS. 1A-1B can include only one type of photochromic polymer of Formula I. In other embodiments, the aqueous photochromic emulsion 140 or 145 can include a mixture of two or more different types of photochromic polymers of Formula I, for example, different photochromic polymers having different types of photochromic moieties in the polymer chain, or the same or different types of photochromic moieties in different polymer chains of the backbone portion.

Because the photochromic polymer of Formula I is converted between its colored and colorless states in response to radiant energy and/or heat, the backbone portion and the photochromic moiety can be desirably selected such that the photochromic polymer of Formula I has thermal properties that can withstand, for example, temperatures at which images can be formed or erased. That is, the photochromic polymer of Formula I is imagable. For example, the photochromic polymer of Formula I can be selected to have a glass transition temperature ranging from about 30° C. to about 150° C., or from about 30° C. to about 100° C., or further from about 55° C. to 80° C. Within the glass transition temperature range, the photochromic layer 240, 245 of FIGS. 2A-2B can convert to a colored state. Further, within the glass transition temperature range, the photochromic polymer can soften to allow the photochromic molecules or compounds to convert to their imaging state. The image can become fixed when the temperature is reduced and the polymer rehardens.

In embodiments, the suitable photochromic moiety can include various photochromic molecules, compounds or monomers, for example, spiropyrans, diethienylethenes, naphthopyrans, chromenes, fulgides, and the like, and mixtures thereof. In embodiments, the photochromic moiety can be easily rearranged in the photochromic polymer to alter the imaging state when exposed to suitable irradiation and heat, but more difficult to rearrange in the photochromic polymer to alter the imaging state when heat is removed. One non-limiting example of a suitable photochromic moiety can include a monomer having the following Formula II:

Formula II

In embodiments, any suitable non-photochromic polymer material can be selected for forming the non-photochromic part of the photochromic polymer of Formula I, i.e., the backbone portion.

Referring back to FIGS. 1A-1B, the aqueous photochromic emulsion 140, 145 can also include a polymer binder mixed with the photochromic polymer of Formula I. In embodiments, the polymer binder can form a polymer matrix to disperse the photochromic polymer wherein, in embodiments, the polymer binder is selected to be a "similar type polymer" of the backbone portion of the photochromic polymer of Formula I.

As used herein, the term "similar type polymers" refers to polymers that differ only in molecular weight, and/or polymers that may differ in chemical formulation but fall into the same general class of chemical compounds. In embodiments, "similar type polymers" can include one or more "similar functional groups" for the same general class of chemical compounds. In embodiments, the term "similar type polymers" can also encompass polymers that are the same, i.e., having a similarity of about 100%.

In embodiments, "similar type polymers" can be determined by "similar functional groups" between polymers. As disclosed herein, "similar functional groups" can differ in molecular weight and can be used to determine the general class of similar type polymers. For example, various acrylics, methacrylics and acrylic (meth-acrylic) copolymers can all be similar type polymers due to the similar or common functional acrylic group. Also, all polyesters can be similar type polymers, although they are not similar to polystyrenes. In embodiments, "similar functional groups" can provide similarity for similar type polymers in any of chemical function, synthetic method, and/or polymer property. In embodiments, similar functional groups can have a similarity of about 100%.

In various embodiments, the polymer binder and the backbone portion of the photochromic polymer of Formula I can be similar type polymers having one or more similar functional groups. In various embodiments, the structure of the polymer binder and of the backbone portion of the photochromic polymer can be defined as polymers resulted from a polycondensation reaction between two different monomers, wherein the first reacting monomer can include, for example, a diacid or diacyl chloride and the second reacting monomer can include, for example, a diol.

For example, the polymer binder and/or the backbone portion of the photochromic polymer can include a reaction product from a first monomer and a second monomer.

In embodiments, the first monomer can include, but is not limited to, diacyl chlorides, diacids, its dimethyl esters, or its cyclic esters such as oxalyl, malonyl, succinyl, glutaryl, adipoyl, pimeloyl, suberoyl, azelaoyl, sebacoyl, fumaryl, terephthalic, isophthalic, phthalic, and mixtures thereof. In embodiments, the first monomer can also include a connecting portion which chemically bonds the diacyl chlorides, diacids or its dimethyl ester functions. The connecting portion of the first monomer can include, for example, a hydrocarbon group that is a straight, branched or cyclic, saturated or unsaturated, substituted or unsubstituted, from 1 to about 40 carbon atoms, or a substituted or unsubstituted aromatic. Additionally, the connecting portion of the first monomer can also include heteroaromatic groups.

In embodiments, the second monomer can include, but is not limited to, bisphenols, diols including bis-phenol A, bisphenol B, bisphenol C, bisphenol F, bisphenol M, bisphenol P, bisphenol AP, bisphenol Z, ethylene glycol, propylene glycol, butylene glycol, pentylene glycol, hexylene glycol, heptylene glycol, diethylene glycol, dipropylene glycol, cyclohexyldimethanol, bisphenol A ethoxylate, or bisphenol A propoxylate, and mixtures thereof. In embodiments, the second monomer can also include a connecting portion which chemically bonds two hydroxyl groups. The connecting portion of the second monomer can include, for example, a hydrocarbon group that is a straight, branched or cyclic, saturated or unsaturated, substituted or unsubstituted, from 1 to about 40 carbon atoms, or a substituted or unsubstituted aromatic. Additionally, the connection portion of the second monomer can also include heteroaromatic groups.

In embodiments, the similar functional groups for similar type polymers of the polymer binder and the backbone portion can include similar hydrocarbon or heteroaromatic connecting portions having straight, branched or cyclic, saturated or unsaturated, substituted or unsubstituted having from about 1 to about 40 carbon atoms and/or having a substituted or unsubstituted aromatic or heteroaromatic group.

In embodiments, the hydrocarbon portion can include homologous series with a general formula of $C_nH_{2n}$, where n is the number of carbon atoms. In embodiments, the $C_nH_{2n}$ moiety can be a backbone for the disclosed hydrocarbon portion of the similar functional groups.

In embodiments, the hydrocarbon or heteroaromatic connecting portion of the homologous series of photochromic polymer and the polymer binder can have the same of or a different number of carbon atoms or heteroatoms. For example, a polymer binder having a hydrocarbon chain of about 4 carbons can work with a photochromic polymer having a hydrocarbon chain made of about 5 carbon atoms.

In various embodiments, one particular example of a suitable photochromic polymer of Formula I, formed from polymer backbone and photochromic moiety, can be a photochromic polymer having the following general Formula III.

Formula III

In Formula III, m can range from about 1 to about 1000, and n can range from 0 to about 1000, although other ranges for m and n can be used, for example, as indicated by Formula I. As shown, an exemplary backbone portion of Formula III can have the following general formula IV.

Formula IV

In various exemplary embodiments, when the photochromic polymer of Formula III is used, the polymer binder can be selected to be essentially a polyester-type polymer similar to the backbone portion of Formula IV.

For example, Formula V shows an exemplary polymer binder that can be combined with the photochromic polymer of Formula III to form an exemplary photochromic composite for the photochromic layer 140, 145.

Formula V

In Formula V, n can range from 1 to about 1000_. For example, n can be an integer ranging from 1 to about 200, or ranging from about 10 to about 100. As disclosed herein, the exemplary backbone portion of Formula IV and the exemplary polymer binder of Formula V can be of "similar type polymers", regardless of the value of n in Formula V.

As another example, Formula VI shows another exemplary polymer binder that can be combined with the photochromic polymer of Formula III to form an exemplary photochromic composite for the photochromic layer 140, 145.

Formula VI

In Formula VI, n can range from 1 to about 1000. For example, n can be an integer ranging from 1 to about 200, or ranging from about 10 to about 100. As disclosed herein, the exemplary backbone portion of Formula IV and the exemplary polymer binder of Formula VI can be of "similar type polymers", regardless of the value of n in Formula VI.

In embodiments, a wax (e.g., a wax latex) can be optionally included with the polymer binder and photochromic polymer. The disclosed combination of polymer binder, photochromic polymer, and wax for the aqueous photochromic emulsion 140, 145 can, when dried to form a photochromic layer 240, 245, eliminate the need for a top protective overcoat on erasable media to prevent sticking, and can provide for increased reusability of erasable media according to the present disclosure as compared with conventional erasable media.

In embodiments, the aqueous photochromic emulsion 140, 145 of FIGS. 1A-1B comprises a photochromic polymer, a polymer binder, a solvent—such as water—and optionally a wax. The aqueous photochromic emulsion can include the polymer binder and the photochromic polymer and/or a wax in any suitable amounts. For example, the polymer binder can be present in an amount of from about 0.1 to about 99.9 percent by weight, such as from about 5 to about 90 percent by weight or about 30 to about 80 percent by weight of the aqueous photochromic emulsion 140, 145. In a another example, the wax can be present in an amount from about 0.1 to about 30 percent by weight, such as about 10 percent by weight of the aqueous composition, and/or from about 3 to about 20 percent by weight of the aqueous photochromic emulsion 140, 145.

In embodiments, the photochromic polymer of Formula I including at least one photochromic moiety covalently bound to a backbone portion, can be present in an amount of from about 0.1 to about 99 percent by weight, such as from about 5 to about 90 percent by weight or about 10 to about 50 percent by weight of the aqueous photochromic emulsion.

In embodiments, the aqueous photochromic emulsion 140, 145 can be formed by dispersing the photochromic polymer of Formula I and the polymer binder, and optionally a wax, in a solvent, such as water. In an embodiment, the aqueous photochromic emulsion can be formed by mixing a solution that contains the polymer binder with the photochromic polymer of Formula I in the presence of water. In an aspect, the solvent can consist essentially of water.

In embodiments, the aqueous photochromic emulsion 140, 145 can exhibit a surface tension (ST) greater than the surface free energy (SFE) of the substrate 120. For example, the aqueous photochromic emulsion 140, 145 can exhibit a surface tension of from about 30 to about 50 dynes/cm, such as from about 35 to about 45 dynes/cm. The SFE of the substrate can range from about 30 to about 45 dynes/cm. Because the aqueous photochromic emulsion 140, 145 exhibits a higher ST than the SFE of a substrate such as regular paper (e.g., Xerox® 4200 paper), this allows the aqueous photochromic emulsion 140, 145 to form a film on top of the substrate 120 surface rather than sitting in the body of the substrate 120 as a conventional solvent-based coating composition would do. This ability to form a film on top of the substrate 120 is but one advantage of the aqueous photochromic emulsion 140, 145 over conventional solvent-based coating compositions.

In other embodiments, the aqueous photochromic emulsion can have a solids content ranging from about 20% to about 80%, such as from about 30% to about 40%.

In embodiments, the aqueous photochromic emulsion 140, 145 can be applied to the substrate 120 of FIGS. 1A-1B. In embodiments, the substrate 120 can be an uncoated substrate, such as plain paper. In various embodiments, the aqueous photochromic emulsion 140, 145 can be applied uniformly to the substrate 120. The aqueous photochromic emulsion 140, 145 can subsequently be dried or otherwise permanently affixed to the substrate 120 to form a photochromic layer 240, 245 on an erasable medium 200A, 200B.

In embodiments where the aqueous photochromic emulsion 140, 145 is coated onto the substrate 120, the coating can be applied by any suitable methods known in the art. For example, a printing or a coating method can be used to apply the composition to the substrate. Exemplary printing methods can include inkjet printing, lithographic or offset printing, flexographic printing, screen printing, stencil printing, stamping, micro-contact printing, gravure, and the like.

Exemplary coating methods can include spin coating, blade coating, rod coating, dip coating, and the like.

In embodiments, the aqueous photochromic emulsion 140, 145 can be dried on the substrate 120, by any suitable methods known in the art, to form a photochromic layer 240, 245. Exemplary drying methods can include oven drying.

In various embodiments, an overcoat layer is not applied over the photochromic layers 240, 245 described above. For example, an overcoat layer is not applied over a photochromic layer 240, 245 comprising a photochromic polymer of Formula I, a polymer binder of Formula V, and a wax. As another example, an overcoat layer is not applied over a photochromic layer 240, 245 comprising a photochromic polymer of Formula I and a polymer binder of Formula VI. Without being limited by theory, it is believed that the wax additive prevents sticking when erasing and prevents document offset problems—issues that were conventionally obviated by applying an overcoat over the photochromic layer.

In embodiments, the photochromic properties of the photochromic moiety covalently bound within the backbone portion can be dictated by the thermal properties of the photochromic polymer of Formula I.

In embodiments, the photochromic polymer, including the photochromic moiety bound to the backbone portion, can have a glass transition temperature ranging from about 30° C. to about 150° C., or from about 30° C. to about 100° C., or further from about 55° C. to about 80° C. Erasable media 200A, 200B can convert to a colored state when both radiant energy, such as UV light, and temperatures ranging from about 30° C. to about 100° C. or to about 150° C. are applied to the erasable medium.

The disclosed erasable media can be imaged at or above the disclosed glass transition temperature to achieve maximum optical density. By tuning the glass transition temperature (Tg) of the photochromic polymer, the photochromic layer 240, 245 can be made to have an extended lifetime for the colored (or imaged) state with little reduction in color contrast relative to the background areas.

According to present teachings, writing an image can be conducted by applying a first stimulus, for example radiant energy and/or heat, to the disclosed erasable medium. The stimulus can provide a specific range of temperatures and/or wavelengths to the erasable medium to cause a color change. An exemplary temperature range for the writing process can be from about 30° C. to about 150° C., or from about 30° C. to about 100° C., or further from about 55° C. to about 80° C. Erasing can be conducted by applying a second, different stimulus, for example applying heat at elevated temperatures to the photochromic layer 240, 245 to reverse the color change in a short time period. An exemplary temperature range for the erasing process can be about 70° C. or above, for example, ranging from about 80° C. to about 200° C. or from about 90° C. to about 100° C.

Various embodiments can also include a method for writing on and erasing the disclosed erasable medium. For example, a transient image can be written in or on the erasable medium and can then be erased from the imaged erasable medium. In embodiments, the erasable medium can be reused to undergo a number of cycles of temporary image formation and temporary image erasure. For example, the erasable medium can be reused at least about 10 times, or at least about 30 times, or at least about 50 times.

Figure 3:
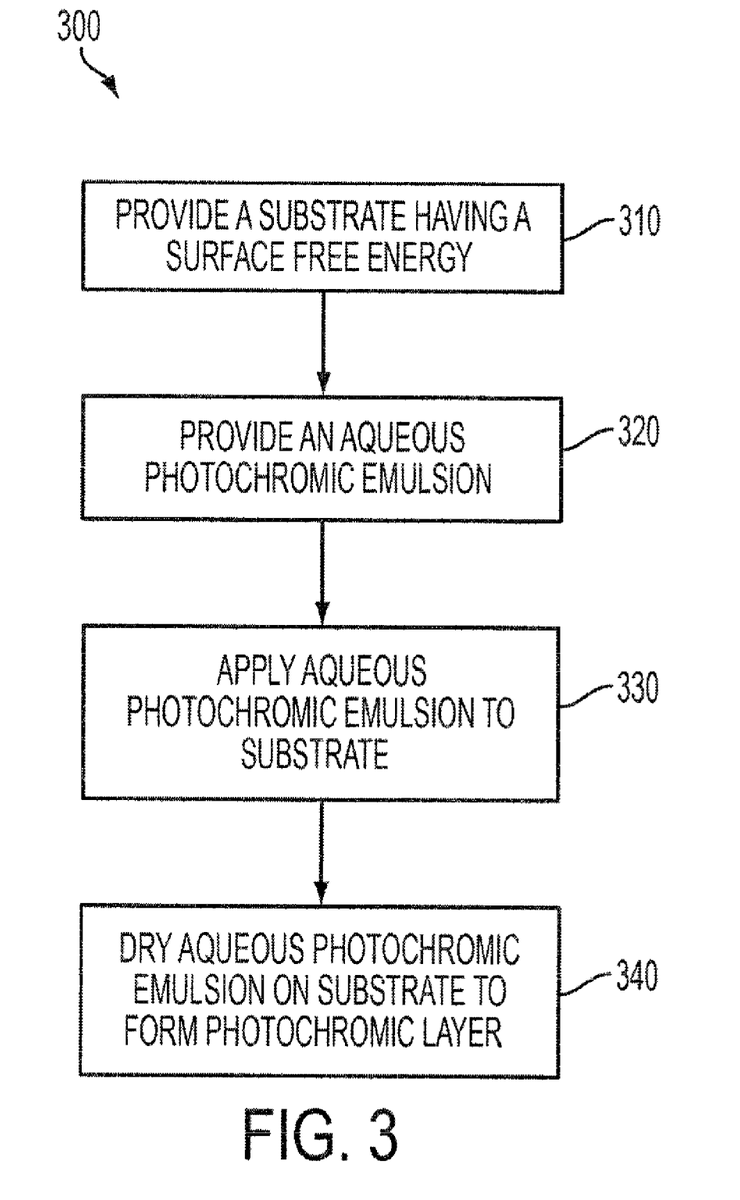
FIG. 3 depicts an exemplary method for making the disclosed erasable medium in accordance with various embodiments of the present teachings.

FIG. 3 depicts an exemplary method 300 for making the disclosed erasable medium in accordance with various embodiments of the present teachings.

At 310, a substrate having a surface free energy can be provided. The surface free energy (SFE) of a substrate can be calculated by any suitable methods in the art, for example, by the Lewis Acid-Base theory. Lewis Acid-Base theory is given by the following equation for solid-liquid interfacial energy:

$$\gamma_j(1+\cos\theta_j) = 2(\gamma_s^{LW}\gamma_j^{LW})^{1/2} + 2(\gamma_s^-\gamma_j^+)^{1/2} + 2(\gamma_s^+\gamma_j^-)^{1/2}$$

where (LW), (+), (−) are the dispersive, acid and base components of the SFE index; j refers to liquids 1, 2, and 3; $\theta_j$ is the contact angle of the $j^{th}$ liquid on the substrate; $\gamma_j$ is the surface tension of liquid j, and subscript "s" refers to the solid.

At 320, an aqueous photochromic emulsion can be provided. For example, the aqueous photochromic emulsion can comprise a photochromic polymer—i.e., a photochromic polymer of Formula I; a polymeric binder—i.e., a binder of Formula V or VI; and optionally, a wax—i.e., a wax latex. The aqueous photochromic emulsion can have a surface tension greater than the surface free energy of the substrate. The surface tension of the aqueous photochromic emulsion can be assessed by any suitable methods known in the art.

At 330, the substrate can be coated with an aqueous photochromic emulsion. The coating can be applied by any suitable methods known in the art.

At 340, the aqueous photochromic emulsion can be dried on the substrate to form a photochromic layer on the substrate. The aqueous photochromic emulsion can be dried by any suitable methods known in the art, for example, oven drying. The substrate including a photochromic layer can be known as an erasable medium, such as erasable medium 200A.

Figure 4:
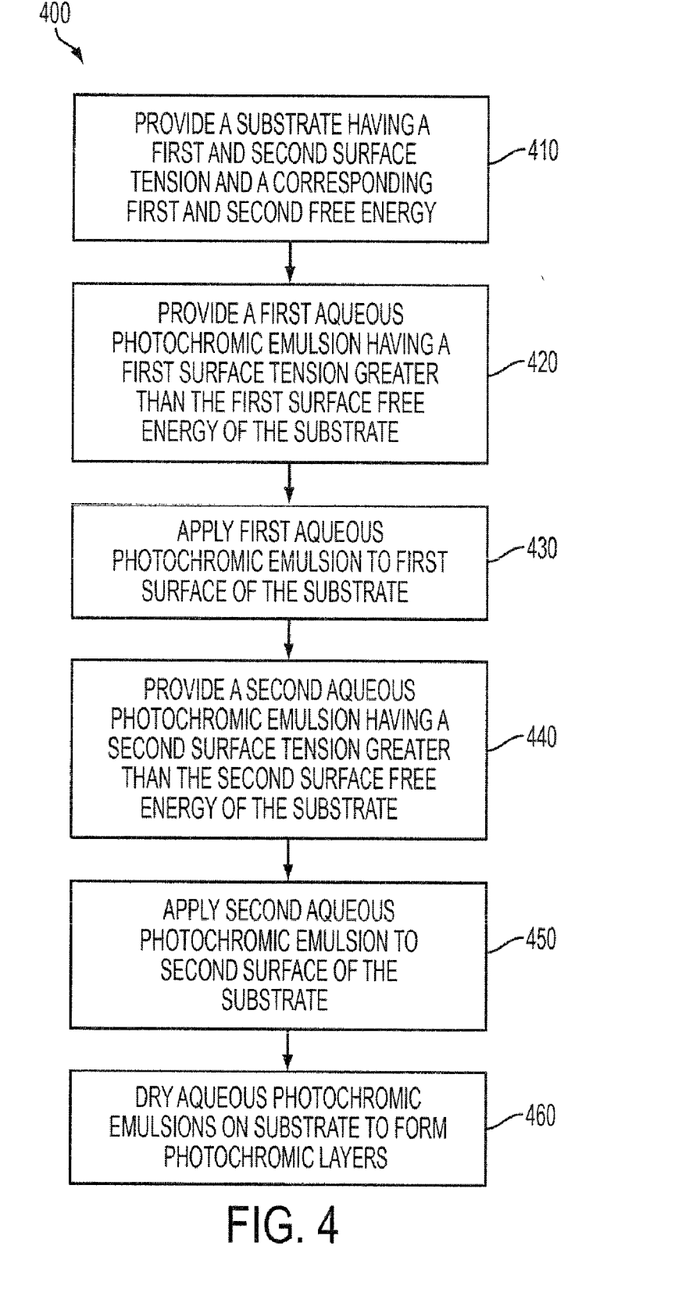
FIG. 4 depicts another exemplary method for making the disclosed erasable medium in accordance with various embodiments of the present teachings It should be noted that some details of the figures have been simplified and are drawn to facilitate understanding of the embodiments rather than to maintain strict structural accuracy, detail, and scale.

FIG. 4 depicts another exemplary method 400 for making the disclosed erasable medium in accordance with various embodiments of the present teachings.

At 410, an uncoated substrate having a first and a second surface and a corresponding first and a second surface free energy, respectively, can be provided. The surface free energy (SFE) of a substrate can be calculated by any suitable methods in the art, for example, by the Lewis Acid-Base theory.

At 420, a first aqueous photochromic emulsion having a first surface tension can be provided. The first surface tension of the emulsion can be greater than the first surface energy of the substrate. The surface tension of the emulsion can be assessed by any suitable methods known in the art. An exemplary photochromic emulsion can comprise a photochromic polymer—photochromic polymer of Formula I; a polymeric binder—i.e., a binder of Formula V or VI; and optionally, a wax—i.e., a wax latex.

At 430, the substrate can be coated on a first surface with the first aqueous photochromic emulsion. The coating can be applied by any suitable methods known in the art.

At 440, a second aqueous photochromic emulsion having a second surface tension can be provided. The second surface tension of the emulsion can be greater than the second surface energy of the substrate. The surface tension of the emulsion can be assessed by any suitable methods known in the art. An exemplary photochromic emulsion can comprise a photochromic polymer—i.e., a photochromic polymer of Formula I; a polymeric binder—i.e., a binder of Formula V or VI; and optionally, a wax—i.e., a wax latex.

At 450, the substrate can be coated on a second surface with the second aqueous photochromic emulsion. The coating can be applied by any suitable methods known in the art.

At 460, the aqueous photochromic emulsions can be dried on the substrate to form photochromic layers on the substrate. The aqueous photochromic emulsions can be dried by any suitable methods known in the art, for example, oven drying. The substrate including the photochromic layers can be known as an erasable medium, such as erasable medium 200B. The aqueous photochromic emulsions can be dried between applications.

In regard to, FIG. 4, the first and second aqueous photochromic emulsions can be the same or different. The first and second surface tensions of the aqueous photochromic emulsions can be the same or different. The first and second substrate surfaces can be the same or different. The first and second surface free energies of the first and second substrate surfaces can be the same or different.

In embodiments, an erasable medium 200A, 200B can be provided or formed as disclosed herein. The erasable medium 200A, 200B can be exposed to a first stimulus, e.g., a writing stimulus, in an image-wise manner to form a visible image. The first stimulus for writing can be, for example, both a radiant energy such as UV light, and a temperature ranging from about 30° C. to about 150° C.

The radiant energy for writing can have any suitable predetermined wavelength, for example, a single wavelength or a band of wavelengths. In various exemplary embodiments, the radiant energy for writing, for example an ultraviolet (UV) light, can have a single wavelength or a narrow band of wavelengths selected from the UV light wavelength range of about 10 nm to about 475 mm, such as a single wavelength from about 200 nm to about 475 nm, or from about 350 nm to about 370 nm or about 365 nm. For each imaging, the erasable medium can be exposed to the radiant energy for a time period ranging from about 10 milliseconds to about 5 minutes, or from about 30 milliseconds to about 4 minutes, or from about 50 milliseconds to about 1 minute. The exemplary UV light can have an intensity ranging from about 0.1 mW/cm$^2$ to about 100 mW/cm$^2$, or from about 0.5 mW/cm$^2$ to about 10 Mw/cm$^2$, or from about 1 mW/cm$^2$ to about 5 mW/cm$^2$.

In various exemplary embodiments, UV light corresponding to the image can be generated by a radiant source, for example, by a LED (light emitting diode) array screen and the image can be formed on the erasable medium by placing the medium on the LED screen for the period of time. In other exemplary embodiments, a UV raster output scanner (ROS) or a UV laser diode (LD) can be used to generate the UV light to sensitize the photochromic polymer from a colorless state to a colored state.

According to various exemplary implementations, the color contrast that renders the image visible to an observer can be a contrast between, for example two, three or more different colors. The term "color" can encompass a number of aspects such as hue, lightness and saturation, where one color may be different from another color if the two colors differ in at least one aspect. For example, two colors having the same hue and saturation but different in lightness can be considered different colors. Any suitable colors, for example, red, white, black, gray, yellow and purple, can be used to produce a color contrast as long as the image is visible to the naked eye of a user. In various exemplary embodiments, the following exemplary color contrasts can be used: purple image on a white background; yellow image on a white background; dark purple image on a light purple background; or light purple image on a dark purple background.

In embodiments, optical density (OD) can be used to characterize erasable media and the formed images. Optical density (OD) can be measured as known to one of ordinary skill in the art after a certain period of time from the application of the first stimulus for writing. Optical density difference ΔOD can then be determined by the difference between the optical density of the formed image $OD_{image}$ and the optical density of the background areas $OD_{background}$. ΔOD can thus be used to characterize color contrast between the image and the background areas. The initial optical density difference ΔOD ($\Delta OD_{t=0}$) between the image and the surrounding background areas upon the application of the first stimulus for writing can be used to characterize initial writability of the erasable medium 100A, 100B. In addition, ΔOD can be used to characterize image lifetime, image readability, as well as reusability of the erasable media.

In embodiments, use of the disclosed aqueous photochromic emulsion can reduce the cost per sheet of erasable media, can reduce the overall energy input when forming erasable media, and can produce an overall "greener" reusable product. In embodiments, use of the disclosed aqueous photochromic emulsion can produce erasable media having improved texture, e.g., erasable media having thinner, paper-like feeling and/or less thick, plastic-like feeling. In embodiments, use of the disclosed aqueous photochromic emulsion can result in a coating process that conforms easier into industry preferred coating processes.

As disclosed herein, the term "lifetime" refers to an amount of time required for the photochromic polymer in a colored state to fully revert or transition back to the colorless state in an ambient condition, or to change the color contrast to the absence of color contrast between the image and the background areas.

As used herein, the term "ambient condition" refers to atypical indoor ambient environment including a light condition that has a light wavelength ranging from about 380 nm to about 750 nm at room temperature ranging from about 20° C. (68° F.) to about 28° C. (82° F.).

In embodiments, the color contrast of the image formed in/on the erasable medium can be maintained for a period of time so as to be readable or recognized by an observer under an ambient condition, even though the color contrast may change, for example, it can diminish during the visible time.

As used herein, the term "readability" or "visibility" of an image encompasses any degree of color contrast, between the image formed in/on the disclosed photochromic layer 240, 245 of erasable media and the surrounding background areas, sufficient to render the image discernable to an observer or user, regardless of whether the color contrast changes or is constant during the visible time.

In embodiments, the "readability" for an image formed in/on the disclosed photochromic layer 240, 245 can be determined by a ΔOD value between the image ($OD_{image}$) and the surrounding background areas ($OD_{background}$). For example, the image formed in/on the disclosed photochromic layer 240, 245 can be "readable" and have a ΔOD value of about 0.05 or more. In embodiments, the formed image can be "readable" having a ΔOD value about 0.1 or more, including about 0.2 or more.

In various embodiments, the image written in/on the disclosed photochromic layer 240, 245 can be "readable" under ambient conditions for a period of time of at least about one day (24 hours), or at least about five days. In some embodiments, the readability of the image formed can be maintained for a period of time of at least about one week, or at least about two weeks, or at least about three weeks. In other embodiments, the color contrast of the formed image in/on the erasable medium can be maintained or readable for at least about one month, or at least about two months, or at least about 3 months.

In addition to providing long image lifetime and long image readability, use of the disclosed photochromic/binder combination can enable the erasable media to have good writability and reusability. For example, the disclosed erasable medium can have an initial ΔOD of at least about 0.75, or in embodiments at least about 0.8, or further at least about 0.9, indicating an increased initial writability of the disclosed photochromic layer 140, 145. In embodiments, the disclosed erasable medium can maintain at least about 30% of initial image quality (initial ΔOD) after 3 days, or at least about 50% or at least about 60% of the initial image quality (initial ΔOD) after 3 days. Further, the disclosed erasable medium can be re-used at least about 10 times, or in embodiments, at least about 50 times, or at least about 100 times.

In various embodiments, the erasable medium bearing the image, i.e., the imaged erasable medium, can be erased by removing color contrast between a non-exposed region and an exposed region by the first stimulus for writing the image.

In various exemplary embodiments, erasure of the image can occur by any of the following: (i) changing the color of the region exposed to the writing stimulus to the color of the region not exposed to the writing stimulus; (ii) changing the color of the non-exposed region to the color of the exposed region; or (iii) changing the color of the exposed region and the color of the non-exposed region to the same color different from both the exposed region color and the non-exposed region color.

In one embodiment, the imaged erasable medium can be erased by applying an erasing stimulus including, for example, heat and/or an erasing irradiation at a wavelength of visible light. In embodiments, the imaged erasable medium can be erased in an erase-on-demand manner. For example, the imaged erasable medium can be selectively exposed to heat. The exposed region for erasure can, for example, change from the colored state to the colorless state at a temperature of about 70° C. or above by a radiant energy source or a heat source, such as infrared (IR) irradiation generating heat, a hotplate, or the like. In embodiments, the temperature used for erasing can be at least about 70° C., for example, ranging from about 80° C. to about 200° C., or from about 90° C. to about 100° C.

In various embodiments for reusing the disclosed erasable medium, the step of exposing the erasable medium to the first stimulus for writing can be performed at least one additional time.

The following examples are illustrative of various embodiments and their advantageous properties, and are not to be taken as limiting the disclosure or claims in any way.

EXAMPLE 1

Aqueous Photochromic Emulsion Synthesis A

An organic mixture of photochromic polymer (4 grams of 10%-SP-C6), binder (10 grams of C6-B), and solvent (130 grams of ethyl acetate) was prepared under a heated oil bath at 70° C. and magnetic stirring. When heated, the organic mixture was left to cool and then filtered with 1-µm syringe filters. In preparation for making the emulsion, 66 grams of the filtered organic mixture was heated in an oil bath at 50° C. in one bottle while 0.325 grams of surfactant (Dowfax 2A1) and 40 grams of distilled water in another. Once heated, the surfactant solution was homogenized using the IKA T-18 basic homogenizer at speed 1. One (1) gram of concentrated ammonium hydroxide ($NH_4OH$) was added to the surfactant solution. Slowly, the organic mixture was added to the surfactant solution while adjusting the height and speed of the homogenizer to obtain optimal homogenization. After all the organic mixture is added, the homogenizer was left to homogenize at speed 6 for thirty (30) minutes. After the 30 minutes, excess solvent was evaporated by heating at 50° C. and under air flow. The evaporation process was stopped when ~25-mL of emulsion was left, and the solution was stirred overnight in the fume hood to ensure complete ethyl acetate removal.

EXAMPLE 2

Aqueous Photochromic Emulsion Synthesis B

An organic mixture of photochromic polymer (4 grams of 10%-SP-C6), binder (10 grams of a compound having Formula VI), and solvent (130 grams of ethyl acetate) was prepared under a heated oil bath at 70° C. and magnetic stirring. When heated, the organic mixture was left to cool and then filtered with 1-µm syringe filters. In preparation for making the emulsion, 66 grams of the filtered organic mixture was heated in an oil bath at 50° C. in one bottle while 0.325 grams of surfactant (Dowfax 2A1) and 40 grams of distilled water in another. Once heated, the surfactant solution was homogenized using the IKA T-18 basic homogenizer at speed 1. One (1) gram of concentrated ammonium hydroxide ($NH_4OH$) was added to the surfactant solution. Slowly, the organic mixture was added to the surfactant solution while adjusting the height and speed of the homogenizer to obtain optimal homogenization. After all the organic mixture is added, the homogenizer was left to homogenize at speed 6 for thirty (30) minutes. After the 30 minutes, excess solvent was evaporated by heating at 50° C. and under air flow. The evaporation process was stopped when ~25-mL of emulsion was left, and the solution was stirred overnight in the fume hood to ensure complete ethyl acetate removal.

Aqueous photochromic emulsions prepared by the processes described above are summarized in Table 1.

TABLE 1

| Example | Photochromic Polymer | Binder | Solids Content |
| --- | --- | --- | --- |
| A | 10%-SP-C6 | C6-B | 41.33% |
| B | 10%-SP-C6 | C6-B | 31.88% |
| C | 10%-SP-C6 | C6-B | 40.04% |
| D | 10%-SP-C6 | Formula VI | 40.24% |

EXAMPLE 3

Surface Tension (ST) of Coating Versus Surface Free Energy (SFE) of Substrate

Aqueous photochromic emulsions according to the processes described above were prepared. The photochromic polymer used was 10%-SP-C6 and the binder used was C6-B or a compound according to Formula VI. These emulsions were compared against conventional solvent-based coating compositions having the same photochromic polymer and binders. The surface tensions (STs) were measured using a Kruss K-100 Tensiometer via the Wilhelmy plate technique, and the results are summarized below in Table 2. For comparison, the measured average surface free energy (SFE) (as obtained by the contact angle measurement method) of uncoated Xerox® 4200 paper after 1-second was 33.13 mN/m, which translates to 33.13 dynes/cm.

TABLE 2

| Components | Type | Solvent | Surface Tension [dynes/cm] | Paper Penetration |
| --- | --- | --- | --- | --- |
| 10%-SP-C6 C6-B | Conventional | Toluene | 29.2 [+/−0.02] | Yes, fully seen on the back side |
| 10%-SP-C6 C6-B | Emulsion | Water | 35.6 [+/−0.02]- 39.6 [+/−0.54] | None |
| 10%-SP-C6 Formula VI | Emulsion | Water | 36.0 [+/−0.06]- 36.6 [+/−0.10] | None |

As seen in Table 2, the surface tension for the two aqueous emulsions (ST=35.6 to 39.6 dynes/cm and 36.0 to 36.6 dynes/cm, respectively) was higher than the SFE of uncoated Xerox® 4200 paper (SFE=33.13 dynes/cm), whereas the surface tension for a conventional solvent-based composition (ST=29.2 dynes/cm) was lower than the SFE of uncoated paper.

The compositions in Table 2 were coated onto uncoated Xerox® 4200 paper to evaluate the extent of paper penetration. Xerox® 4200 paper was stretched (pressure of 2 kPa) on a Mathis Lab Coater. During manual drawdown, rod number 16 was used to coat the emulsion onto the Xerox® 4200 paper. After coating was finished, the coated paper was baked in an oven (Mathis Lab Dryer) at 80° C. for 1 minute. As seen in Table 2, none of the aqueous emulsions significantly penetrated the uncoated paper. In comparison, paper penetration of the conventional solvent-based coating was significant since the photochromic materials were perfectly detectable on the backside of the paper. Thus, increasing the ST of the coating solution to a value higher than the corresponding SFE of the paper substrate provided no paper penetration on regular, porous Xerox® 4200 paper.

The paper SFE was calculated based on the contact angle measurement by using three liquids: water, formamide, and diiodomethane. The dynamic contact angle was measured by using a Fibro DAT1100 instrument. Eight (8) drops were generated and measured, and the average contact angle was recorded. Surface Free Energy (SFE) is calculated by the Lewis Acid-Base method disclosed herein. The results are summarized in Table 3 below.

TABLE 3

| Liquid | $\gamma$ (erg/cm$^2$) | $\gamma^{LW}$ (erg/cm$^2$) | $\gamma^+$ (erg/cm$^2$) | $\gamma^-$ (erg/cm$^2$) |
|---|---|---|---|---|
| Water | 72.8 | 21.8 | 25.5 | 25.5 |
| Formamide | 58 | 39 | 2.28 | 39.6 |
| Diiodomethane | 50.8 | 50.8 | 0 | 0 |

On a non-porous substrate, the contact angle is a measure of the wetting capability of a given solution. In the case of a porous substrate, contact angle is influenced by the wetting capability and by the paper porosity. As a result, the SFE measured on porous substrates is expected to be relatively inaccurate when compared with non porous substrates. However, because the paper substrate is kept the same (Xerox® 4200 paper) for all coating tests herein, relative accuracy is not a problem.

EXAMPLE 4

Writability of Erasable Media

The aqueous photochromic emulsions in Table 1 (Examples A, B, and D) were sieved with a 25-µm sieve (USA Standard Testing Sieve) to remove any particulates and coated onto Xerox® 4200 paper as described below. Additionally, conventional solvent-based coating compositions including 10%-SP-C6 as a photochromic polymer and either C6-B as a binder (Example E) or a compound according to Formula VI as a binder (Example F) were also coated onto Xerox® 4200 paper as described below.

Xerox® 4200 paper was stretched (pressure of 2 kPa) on a Mathis Lab Coater. During manual drawdown, rod number 16 was used to coat the emulsion or the conventional solvent-based coating composition onto Xerox® 4200 paper. After coating was finished, the coated paper was baked in an oven (Mathis Lab Dryer) at 80° C. for 1 minute. The coated papers were then tested and the results are summarized in Table 4.

Writing was performed by exposure to about 365 nm UV light from an LED while simultaneously heating the sample at about 70° C., to approximate conditions equivalent to 5 ppm printing speed.

TABLE 4

| Example | Background OD (t = 0) | Initial Writability ΔOD (t = 0) | Image Lifetime ΔOD (t = 3 days) | Solids Content | Comments |
|---|---|---|---|---|---|
| B | 0.32 | 0.66 | N/A | 31.88% | Emulsion |
| A | 0.35 | 0.76 | 0.55 | 41.33% | Emulsion |
| D | 0.24 | 0.80 | 0.67 | 40.24% | Emulsion |
| E | 0.27 | 0.88 | 0.66 | N/A | Solvent |
| F | 0.18 | 0.85 | 0.64 | N/A | Solvent |

Table 4 shows that aqueous photochromic emulsion coated paper, such as Examples A and D, performed comparably to conventional solvent-based coated paper. Examples A and D exceeded initial writability expectations (ΔOD>0.75) with ΔOD (t=0) of 0.76 and 0.80, respectively. Additionally, after 3 days, Examples A and D maintained over 50% of the initial image quality (ΔOD t=0 compared to ΔOD t=3 days). Optical density was measured using Spectrolino Spectrophotometer from GretagMacbeth (New Windsor, N.Y.) with Color Quality Lite (version 3.6) software.

Thus, erasable media according to the present disclosure perform at least as well as conventional solvent-based coatings. However, because the presently disclosed emulsions are water-based and essentially free of volatile solvents, such as ethyl acetate, erasable media according to the present disclosure reduce overall energy input by about 30% as compared to conventional solvent-based coatings. By eliminating the need for volatile solvents, erasable media according to the present disclosure do not need solvent recovery equipment during the coating process, which reduces overall product costs and eliminates the need for an explosion-proof coating facility. Therefore, erasable media according to the present disclosure and are overall "greener" products compared to erasable media with solvent-based coatings. Erasable media according to the present disclosure also have a thinner, paper-like feeling instead of a thick, plastic-like feeling.

EXAMPLE 5

Photochromic Emulsion Coating without Wax

Aqueous photochromic emulsions according to Examples 1 and 2 were sieved with a 25-µm sieve (USA Standard Testing. Sieve) to remove any particulates. Xerox® 4200 paper was stretched (pressure of 2 kPa) on a Mathis Lab Coater. During manual drawdown, rod number 16 was used to coat the emulsion onto the Xerox® 4200 paper. After coating was finished, the coated paper was baked in an oven (Mathis Lab Dryer) at 80° C. for 1 minute to produce an erasable medium.

EXAMPLE 6

Photochromic Emulsion Coating with Wax

Aqueous photochromic emulsions according to Examples 1 and 2 were sieved with a 25-µm sieve (USA Standard Testing Sieve) to remove any particulates. IGI Wax (sieved using the same 25-µm sieve) was added to the photochromic emulsion to produce an emulsion having 10 wt. % wax. Xerox® 4200 paper was stretched (pressure of 2 kPa) on a Mathis Lab Coater. During manual drawdown, rod number 16 was used to coat the photochromic emulsion onto the Xerox® 4200 paper. After coating was finished, the coated paper was baked in an oven (Mathis Lab Dryer) at 80° C. for 1 minute to produce an erasable medium.

EXAMPLE 7

Sticking (or Non-Sticking) Performance

For erasable media according to Examples 5 and 6, writing was performed by exposure to about 365 nm UV light from an LED while simultaneously heating the sample at about 70° C., to simulate conditions equivalent to 5 ppm printing speed. The imaged erasable media where subsequently erased by passing through a fuser (at 150° C.) and at 5 ppm. The results are summarized in Table 5 below.

In all examples, the photochromic polymer was 10%-SP-C6. For Example G, the binder was C6-B and included no wax. For Example H, the binder was C6-B and included a wax. For Example J, the binder was a compound according to Formula VI and included no wax. For Example K, the binder was a compound according to Formula VI and included a wax.

TABLE 5

| Example | Initial Writability ΔOD (t = 0) | Average Stick Performance |
|---|---|---|
| G | 0.70 | + to ++ |
| H | 0.69 | +++ |
| J | 0.80 | +++ |
| K | 0.80 | +++ |

*Average Stick Performance: 0 means fully stuck and +++ means perfect (no sticking at all). Ranking in between means unreliable media.

Table 5 shows that aqueous photochromic emulsions containing C6-B as binder stuck in the fuser when no wax was present (Example G) but did not stick when wax was present (Example H). Aqueous photochromic emulsions containing a compound according to Formula VI as binder did not stick to the fuser regardless of wax content. Thus, producing erasable media coated with the presently disclosed aqueous photochromic emulsions eliminates the need for a protective overcoat (as needed with solvent-based coatings) to prevent sticking. By eliminating the need for a protective overcoat, a non-stick reusable product can be produced by coating with only one layer instead of two, thus providing significant cost savings in both materials and labor.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method for making an erasable medium comprising:
providing a substrate having a surface free energy;
providing an aqueous photochromic emulsion having a surface tension greater than the surface free energy of the substrate, wherein the aqueous photochromic emulsion comprises a photochromic polymer, a polymer binder, and solvent, wherein the solvent consists essentially of water;
applying the aqueous photochromic emulsion to the substrate; and
drying the applied aqueous photochromic emulsion on the substrate to form a photochromic layer.

2. The method of claim 1, wherein the substrate is uncoated prior to applying the aqueous photochromic emulsion to the substrate.

3. The method of claim 1, wherein the aqueous photochromic emulsion comprises a solids content ranging from about 20 to about 80%.

4. The method of claim 1, wherein the aqueous photochromic emulsion provides a surface tension ranging from about 30 to about 50 dynes/cm.

5. The method of claim 1, wherein the substrate has a surface free energy ranging from about 30 to about 45 dynes/cm.

6. The method of claim 1, wherein the aqueous photochromic emulsion further comprises a wax.

7. The method of claim 1, wherein the substrate is selected from the group consisting of, wood, plastic, fabric, textile, and paper.

8. A method for making an erasable medium comprising:
providing an uncoated substrate having a first and a second surface and a corresponding first and a second surface free energy;
providing a first aqueous photochromic emulsion having a first surface tension greater than the first surface free energy of the substrate, wherein the aqueous photochromic emulsion comprises a photochromic polymer, a polymer binder, and solvent, wherein the solvent consists essentially of water;

applying the first aqueous photochromic emulsion to the first surface of the substrate;

providing a second aqueous photochromic emulsion having a second surface tension greater than the second surface free energy of the substrate, wherein the aqueous photochromic emulsion comprises a photochromic polymer, a polymer binder, and solvent, wherein the solvent consists essentially of water;

applying the second aqueous photochromic emulsion to the second surface of the substrate; and drying the applied first and second aqueous photochromic emulsions on the substrate to form photochromic layers, wherein the first and second substrate surface can be the same or different, and wherein the photochromic layers can be the same or different.

9. The method of claim 8, wherein the aqueous photochromic emulsion further comprises a wax.

10. The method of claim 8, wherein the aqueous emulsion has a surface tension ranging from about 30 to about 50 dynes/cm.

11. The method of claim 8, wherein the aqueous photochromic emulsion comprises a solids content ranging from about 20 to about 80%.

12. The method of claim 8, wherein the substrate is plain paper.

* * * * *